// 350-286
// 8/3/76    OR    3,972,596    SR

United States Patent [19]
Baumgardner et al.

[11] 3,972,596
[45] Aug. 3, 1976

[54] VIEW EXPANDING AND DIRECTING OPTICAL SYSTEM

[75] Inventors: John D. Baumgardner; Dorothy J. Ebeling, both of Holland, Mich.

[73] Assignee: Donnelly Mirrors, Inc., Holland, Mich.

[22] Filed: May 31, 1973

[21] Appl. No.: 365,514

Related U.S. Application Data

[62] Division of Ser. No. 252,611, May 12, 1972, Pat. No. 3,809,461.

[52] U.S. Cl. .............................. 350/286; 350/211; 350/307
[51] Int. Cl.² .......................................... G02B 5/04
[58] Field of Search .................... 350/211, 286, 307

[56]         References Cited
          UNITED STATES PATENTS

| 2,679,179 | 5/1954 | Falge et al. ......................... 350/286 |
| 2,953,961 | 9/1960 | Court ................................... 350/211 |
| 3,809,461 | 5/1974 | Baumgardner ..................... 350/286 |

FOREIGN PATENTS OR APPLICATIONS 790,905   9/1935   France

*Primary Examiner*—Alfred E. Smith
*Assistant Examiner*—Richard A. Rosenberger
*Attorney, Agent, or Firm*—Price, Heneveld, Huizenga & Cooper

[57]                  ABSTRACT

A view expanding and directing optical system for use in viewing around obstacles and the like comprising in combination a negative Fresnel lens and a Fresnel prism disposed in separate planes immediately adjacent one another. In the preferred embodiment, the system is mounted on a vehicle, at the rear thereof, whereby the system provides an expanded and demagnified viewing area to the rear of and below the level of the rear window and/or laterally of the vehicle. In other embodiments, the system may be coupled to means for extending or retracting it at desired times, and may be used in conjunction with vision aiding elements, such as a rearview periscope, for providing an expanded and demagnified viewing area laterally and to the rear of the vehicle.

15 Claims, 22 Drawing Figures

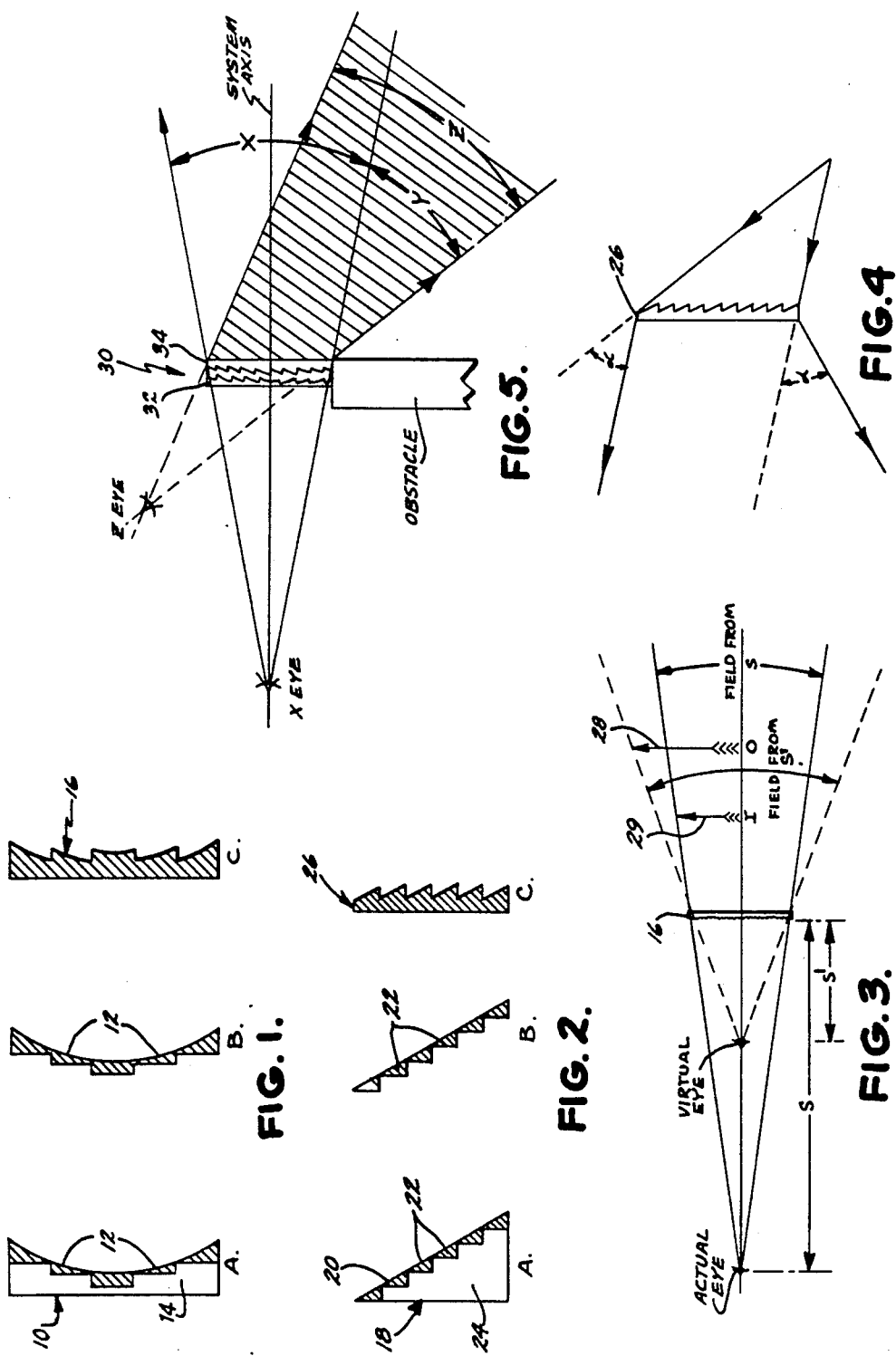

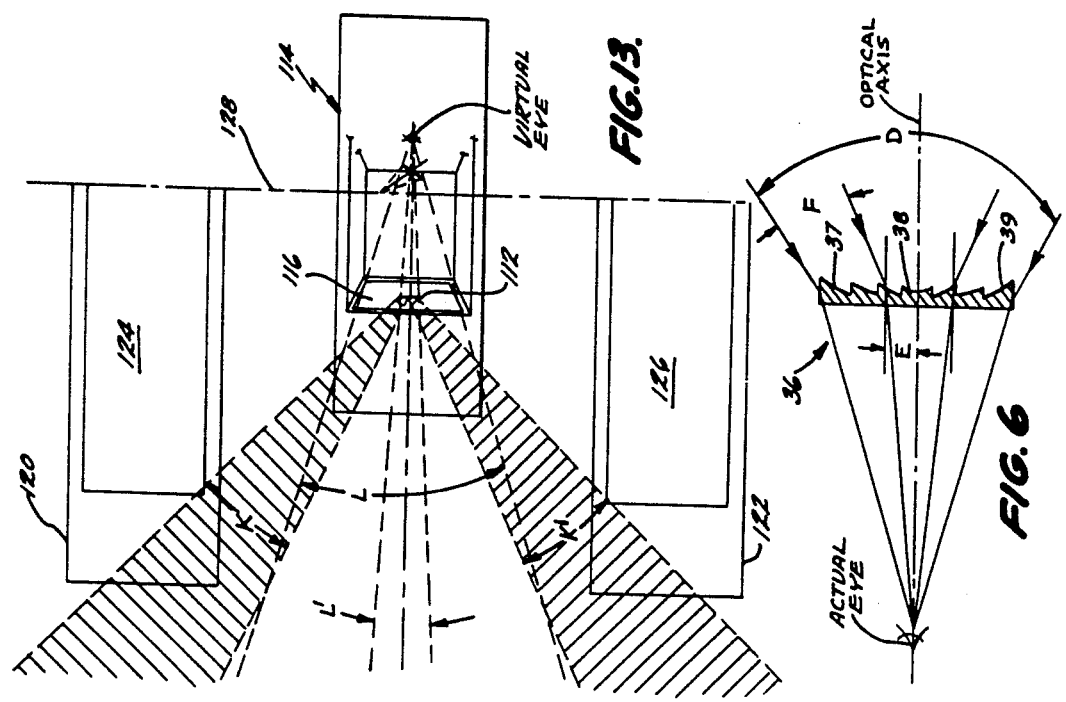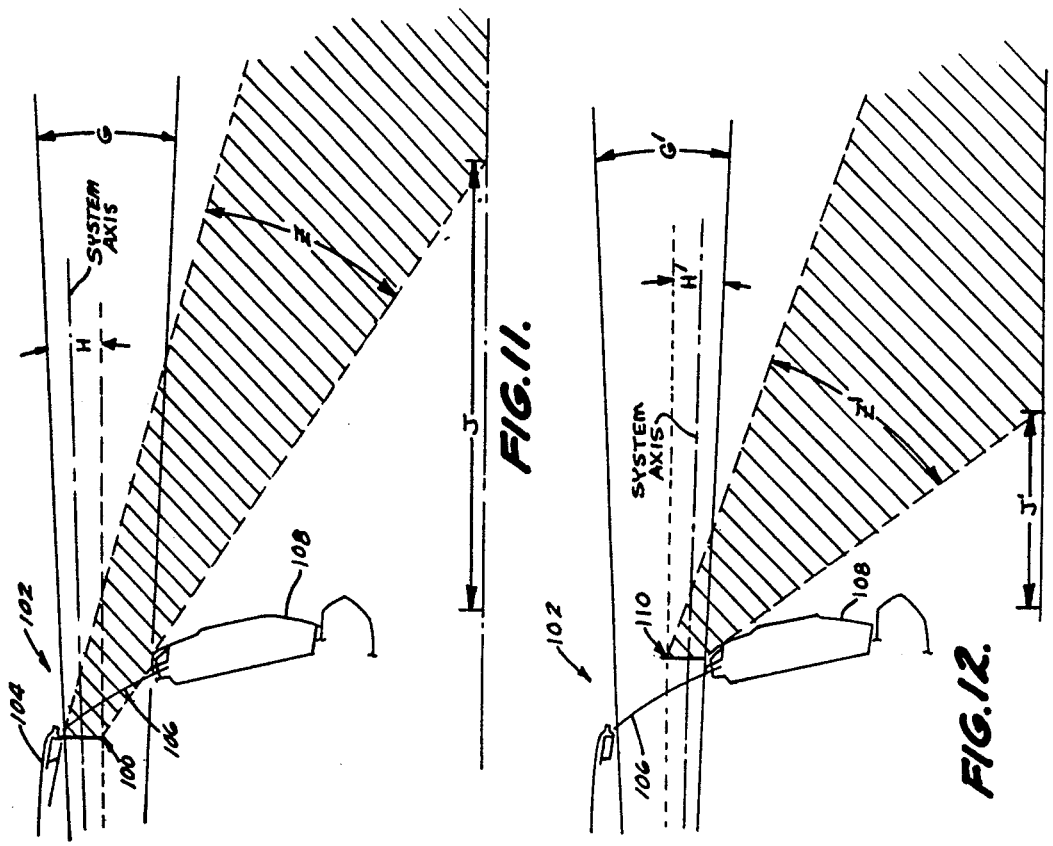

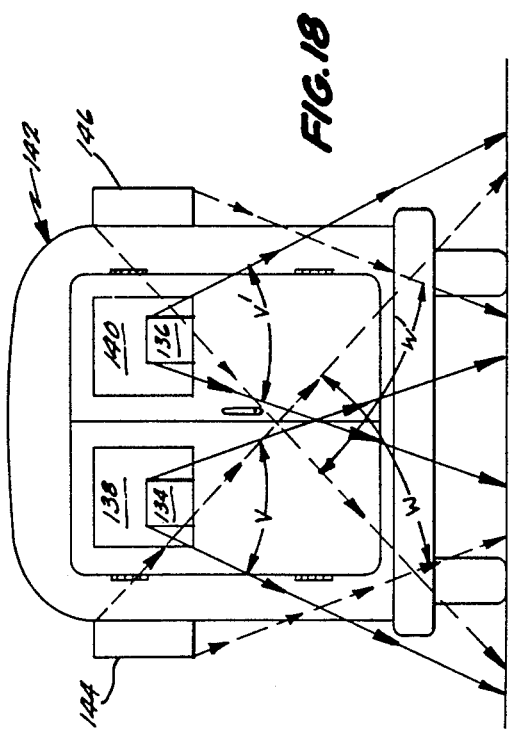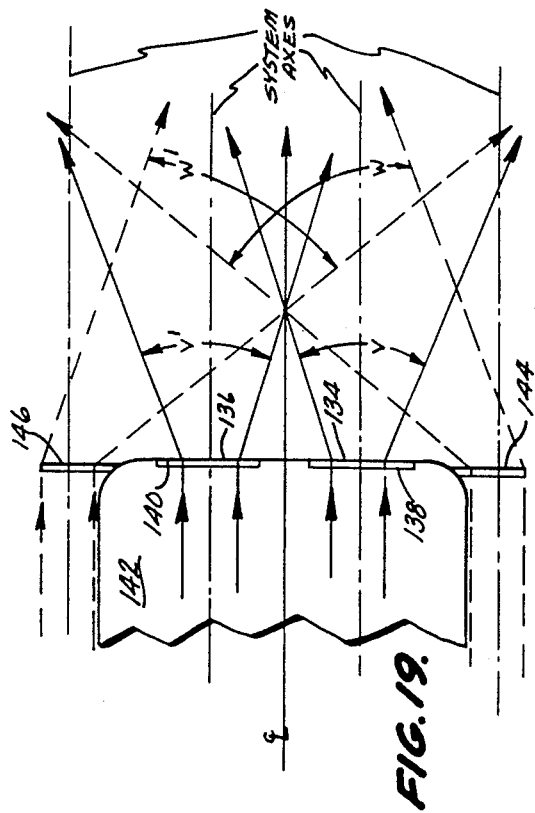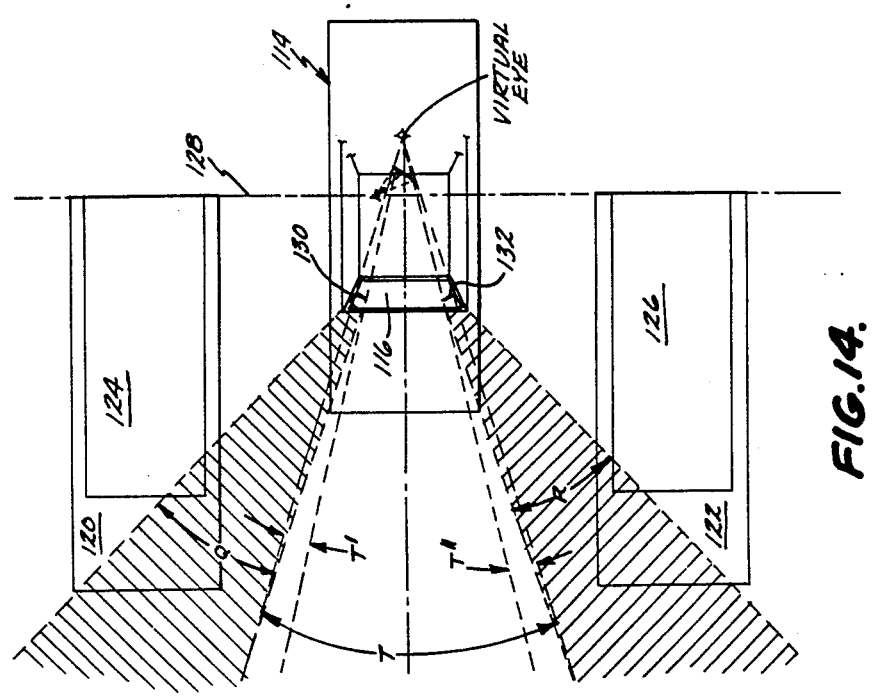

VIEW EXPANDING AND DIRECTING OPTICAL SYSTEM

This is a divisional of application Ser. No. 252,611 filed May 12, 1972, now U.S. Pat. No. 3,809,461.

The present invention relates to view expanding optical systems for increasing and expanding the field of view around obstacles and the like and, more particularly, to an optical system for use on vehicles for expanding the field of view of a person within a vehicle such that that person may view areas which normally are blocked from view by portions of the vehicle.

BACKGROUND OF THE INVENTION

It has long been a problem for persons constrained within the boundaries of an area, such as within a vehicle, to view the area beyond and behind those boundaries, since the boundaries, if not transparent, form an obstacle to the person's vision. In the case of vehicles, and more particularly, in the case of land vehicles such as automobiles and the like, the driver or passenger within the vehicle have a field of vision which is limited by the structural components of the vehicle. Thus, the driver of the vehicle may have his vision extremely restricted by portions of the vehicle such as roof support posts, articles loaded between himself and the rear window of the vehicle, and the like, such that large "blind spots" result. The elimination of such blind spots has occupied the design and engineering skills of many persons in recent years due to the large number of automobiles and other vehicles using modern roadways, and in accordance with the increasingly more strict safety requirements imposed on the automobile manufacturers by the governments of the United States and other countries.

In the past, several solutions have been proposed to eliminate such blind spots. Some of these proposed solutions include roof mounted rearview periscopes, wrap around windshields and rear windows, and slide or fender mounted rearview mirrors. All of these developments helped in various degrees to alleviate portions of the viewing problems encountered in driving an automobile. However, none of these developments adequately solved the problem of viewing immediately behind a vehicle or other object such that the path of travel which the vehicle would take to the rear could be examined for the presence of small children, tools, pails, and the like which would be otherwise run over if the driver were not notified of their presence. Consequently, the problem of making the area immediately to the rear of a vehicle visible to the driver has become and remained an extremely important aspect of vehicular safety. The present novel inventive concept was conceived and developed in recognition of and as a solution for this important problem, although it has utility elsewhere.

SUMMARY OF THE INVENTION

Accordingly, it is an object and feature of the present invention to provide an optical system for expanding the field of view of a person positioned behind an obstacle such that that person may view the area outside of the area of his direct and normal vision behind the obstacle.

It is another object and feature of the present invention to provide an optical system for vehicles for expanding the field of view of a driver or passenger within the vehicle such that that person may view areas which normally are blocked from view by portions of the vehicle.

It is a further object and feature of the present invention to provide a relatively thin optical system for vehicles which is susceptible of being mounted in various positions in the interior and on the exterior of the vehicle or on vehicle accessories such that the driver's or passenger's normal and direct area of vision is maintained, while the present novel optical system provides an expanded and demagnified viewing area of either the area immediately to the rear of the vehicle, the area laterally of each side of the vehicle, or the area laterally of each of the vehicle below the window areas of the vehicle.

It is yet another object and feature of the present invention to provide an economical, space saving, optical system which may be constructed to provide an expanded and demagnified viewing area of any one of several areas laterally and/or to the rear of a vehicle, which system may be coupled with the transmission of the vehicle to extend the optical system when its use is needed or desired, and to retract the optical system at other times.

These and other objects and features of the present invention may be accomplished by providing a view expanding optical system for expanding the field of view around obstacles and the like comprising in combination a Fresnel lens having a negative focal length and a Fresnel prism having a uniform, specified angle of deviation of incident light rays. The negative Fresnel lens and Fresnel prism are disposed in separate planes parallel to and immediately adjacent one another in the preferred embodiment either on another transparent supporting surface or in a frame or other support means along a system axis. The system axis comprises a line of sight extending from a specified or predetermined eye position of the person viewing through the optical system through the geometric center, i.e., the center of the geometric area covered by the Fresnel lens and Fresnel prism. The negative Fresnel lens and Fresnel prism combine to refract the light entering the system from behind an obstacle or the like such that the virtual eye position of the person viewing through the system is shifted to a point intermediate the distance between a specified or predetermined eye position and the system and away from the system axis. The shift in the virtual eye position enables a person viewing through the system to view an expanded and demagnified viewing viewing area on the opposite side of the system from the specified eye position and outside the direct vision area which is defined by the light rays traveling along a line of sight from a specified eye position through the edges of the system.

When mounted adjacent the rear of a vehicle, either interior or exterior of the rear of that vehicle, the optical systems allows a driver or passenger within the vehicle to view an expanded and demagnified viewing area either to the rear of the vehicle and/or laterally to the side of the vehicle depending on the specific configuration of the system or laterally to the side of the vehicle below the window areas of the vehicle. When so mounted on a vehicle, the size and position with respect to the system axis of the expanded and demagnified viewing area are dependent on the magnitude of the negative focal length of the Fresnel lens, the magnitude of the angle of deviation of the Fresnel prism, the position and relative angular orientation of the lens and prism within the support means, and the angular position of the system as mounted on the vehicle with respect to the system axis.

Additionally, the mounting of the system on the vehicle may include a means coupled to the transmission of the vehicle such that when the vehicle is placed in reverse, or the use of the optical system is otherwise desired, the optical system will be extended from the vehicle into a proper position for providing the expanded and demagnified viewing area to the rear or laterally of the vehicle.

These and other objects, advantages and features of the invention will become apparent from a study of the following description taken in conjunction with the drawings.

BRIEF DESCRIPTION OF THE DRAWINGS

FIG. 1 is a schematic representation of the theory upon which the manufacture of a negative Fresnel lens is based;

FIG. 2 is a schematic representation of the theory upon which the manufacture of a Fresnel prism is based;

FIG. 3 is a schematic representation of the field of view obtained with a negative Fresnel lens alone;

FIG. 4 is a schematic representation of the field of view or optical refracting qualities of a Fresnel prism alone;

FIG. 5 is a schematic representation comparing the normal direct vision viewing area, the viewing area obtained with the negative Fresnel lens along, and the expanded, demagnified viewing area obtained with the novel, inventive combination of the negative Fresnel lens and Fresnel prism disclosed in the present invention;

FIG. 6 is a schematic representation of the refractive optical qualities of various sections of a single negative Fresnel lens;

FIG. 11 is a side elevation of the expanded and demagnified viewing area obtained with the optical system comprising the present invention when mounted on the tailgate of an automobile of the station wagon type;

FIG. 12 is a side elevation of the expanded and demagnified viewing area obtained with the optical system comprising the present invention when the system is mounted on the roof area interior of and adjacent to the rear window of an automobile of the station wagon type;

FIG. 13 is a plan view of the expanded and demagnified viewing area laterally of both sides of an automobile of the sedan type when another embodiment of the present invention is mounted interior of and adjacent to the rear window of such an automobile;

FIG. 14 is a plan view of the expanded and demagnified viewing area laterally of both sides of an automobile of the sedan type when still another embodiment of the present invention is mounted interior of and adjacent to both sides or edges of the rear window of an automobile of that type;

FIG. 18 is a rear elevation of a typical van or panel type truck showing the expanded and demagnified viewing areas obtained when two different embodiments of the present novel invention are mounted thereon;

FIG. 19 is a plan view of the expanded and demagnified viewing areas obtained with the embodiments of the present invention shown in FIG. 18;

DESCRIPTION OF THE PREFERRED EMBODIMENT

Figure 7:
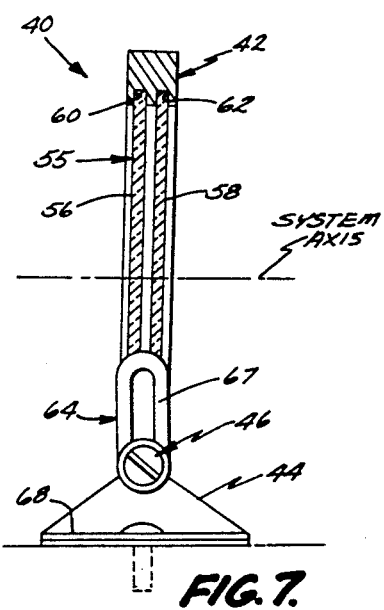
FIG. 7 is a side elevation of one embodiment of the support means for mounting the optical system comprising the present invention on a vehicle.

Referring now in greater detail to the drawings, FIGS. 1 and 2 show schematically the optical and physical theory underlying the manufacture of both a negative Fresnel lens and a Fresnel prism. Generally, the theory behind the formation of a Fresnel lens or Fresnel prism is the elimination of all unnecessary thicknesses of the material used to form either the lens or the prism. Thus, as shown in FIG. 1, a typical divergent of the negative lens 10 is shown with its divergent or curved refracting surface segmented into a plurality of parts or sections 12. The unshaded area 14 is unnecessary to the refractive qualities of the lens since light is refracted only as it enters and leaves a lens in relation to the index of refraction of the lens. The refractive qualities are thus a function of the curvature and index of refraction of the lens. Additionally, for the thin lenses shown and described herein, the thickness of the lens will have no effect on the lens characteristics. Consequently, the unshaded area 14 shown in FIG. 1A may be eliminated without significantly altering the optical qualities of the lens, as shown in FIG. 1B. The formation of the Fresnel lens is further perfected as shown in FIG. 1C by combining the necessary light-refracting sections 12 on a flat sheet of the same material which is used to form the curved sections of the lens. The result is a negative Fresnel lens 16 having the same refractive qualities for incident light rays as the original, normal lens 10, but being relatively thin and taking up little more space than a normal pane or thickness of glass.

Similarly, a Fresnel prism may be formed using only the required refracting surfaces and sections of a normal prism as shown in FIG. 2. Thus, in FIG. 2A, a typical prism is shown at 18 with its refracting surface 20 segmented into a plurality of sections 22. The unnecessary thicknesses 24 of prism 18 may be eliminated as shown in FIG. 2B leaving only the necessary refracting sections 22. Finally, as shown in FIG. 2C, the necessary refracting sections 22 may be combined on a flat or planar piece of material used to form the refracting sections of the prism such that the generally planar, thin Fresnel prism 26 results. The Fresnel prism 26 has the same refracting qualities for all incident light rays as does the typical prism 18 from which it was formed, but is relatively thin and takes up little more space than a normal thickness of glass, as described above in a similar fashion for the negative Fresnel lens 16.

Referring now to FIG. 3, the optical qualities of a negative Fresnel lens by itself will be described in greater detail. As depicted therein, a negative Fresnel lens 16 focuses the light rays incident on the lens 16 from an area wider than the area which could normally be viewed from the position of the actual eye through the actual physical boundaries of the lens 16. Thus, although the actual eye position is a distance S from the lens 16, where the field of vision would normally be as indicated in FIG. 3 through the boundaries of the lens 16, the negative Fresnel lens has the optical refractive quality of focusing the incident rays of light from a wider field of view at the virtual eye position indicated in FIG. 3, the distance S of the virtual eye position from lens 16 thereby providing a field of view from S as indicated in FIG. 3, which would correspond to the viewing area visible by a person viewing through the physical boundaries of lens 16 from the virtual eye position. Thus, the negative Fresnel lens focuses the incident light rays such that the eye position of the viewer is, in effect, moved closer to the lens thereby providing a larger or wider field of view. Additionally, the negative Fresnel lens 16 has the optical quality of demagnifying or minifying objects viewed therethrough. Thus, an object arrow 28 positioned at 0 as shown in FIG. 3 will be seen as an image 29 reduced in size from the size of the actual object arrow 28 at a position 1 as shown in FIG. 3. Thus, the overall qualities of the negative Fresnel lens 16 combine to produce an expanded demagnified viewing area.

Referring to FIG. 4, the optical refractive qualities of a Fresnel prism 26 will be described. As shown therein, all incident light rays entering the prism 26 will be refracted by the prism through a uniform and specified angle of deviation represented by angle alpha. The specific angle of deviation alpha for the prism 26 is dependent on the angle of the refracting surfaces relative to the incident light rays and the index of refraction of the material used to form the prism. The prism does not focus any light rays incident thereon, but merely changes the direction or refracts the incident light rays through a uniform and constant angle of deviation represented by alpha in FIG. 4.

Referring now to FIG. 5, the present novel inventive concept is shown which combines a negative Fresnel lens 32 and a Fresnel prism 34 in a unique relationship into an optical system 30. The optical system 30 is relatively thin and requires little space and may be mounted adjacent an obstacle, such as that shown in FIG. 5, for expanding the field of view around such obstacles. Thus, the area immediately behind the obstacle may be viewed by the person at the actual eye position, $X_{eye}$, which is on the opposite side of the optical system 30 from the area to be viewed. The negative Fresnel lens 32 and Fresnel prism 34 are generally disposed adjacent and parallel one another along a system axis defined by the line extending from the actual eye position, $X_{eye}$, through the geometric center of the lens and prism. A person viewing through the boundaries of the optical system 30 without the optical system would normally view an area denoted by X in FIG. 5. However, with the inclusion of the optical system 30, the unique combination of the negative Fresnel lens 32 and Fresnel prism 34 shifts the virtual eye position to $Z_{eye}$, i.e., to a position intermediate the actual eye position, $X_{eye}$, and the optical system 30 and away from the system axis. Thus, the field of view visible with the optical system 30 is an expanded and demagnified viewing area which, for the embodiment shown in FIG. 5, is immediately behind and below the obstacle and on the opposite side of the optical system 30 from the actual eye position $X_{eye}$. Thus, the optical system 30 provides a means for shifting the vantage point of a viewer using the system to a point closer to and away from the system axis which, if he were actually in that position, would allow him to view directly the expanded viewing area. It will be understood that the expanded and demagnified viewing area visible with optical system 30 includes an area Z. Area Z includes a portion Y which is outside the direct normal vision area represented by X.

It will also be understood that, because of the optical characteristics of the lens and prism components combined to form the optical system 30, that the size and position with respect to the system axis of the expanded and demagnified viewing area Z, is dependent on several factors. These factors include the magnitude of the negative focal length of the negative Fresnel lens, the magnitude of the angle of deviation of the Fresnel prism, and the angle of the planes in which the Fresnel prism and Fresnel lens lie with respect to the system axis.

Further, the field of view visible through optical system 30 is demagnified or minified. Typical values for the demagnification and field of view using, for example, a negative Fresnel lens which is circular in shape and is rotationally geometrically symmetrical with respect to its optical axis, i.e., may be rotated about its optical axis without changing the field of view obtained therethrough, having a ten-inch diameter with a focal length of minus twelve inches and a correspondingly sized Fresnel prism, with the distance of the actual eye position being about eighty inches from the surface of the lens, provide a maximum demagnification or minimum magnificiation of approximately 0.13 or 13% of normal size and a field of view, corresponding to Z in FIG. 5 of approximately 51°.

Referring now to FIG. 6, the optical characteristics of an asymmetrical negative Fresnel lens of an off-axis negative Fresnel lens section will be described in greater detail. As shown therein, a negative Fresnel lens 36 is shown divided or segmented into three sections 37, 38 and 39. The entire negative Fresnel lens 36 may be described as a rotationally optically symmetrical negative Fresnel lens since no matter how the lens 36 is rotated in a plane perpendicular to the optical axis, about the optical axis, it will always refract and focus the incident light rays entering from all parts of the field of view D to the actual eye position. However, sections of the optically symmetrical negative Fresnel lens 36 which are spaced from the optical axis by a certain distance such as that represented by E in FIG. 6, are "off-axis" sections such as section 37 and are optically asymmetrical and focus only those incident light rays entering from the field of view represented by F to the actual eye position. Accordingly, sections of a rotationally optically symmetrical negative Fresnel lens 36 may be selected for their degree of "asymmetry," i.e., the distance by which they would be spaced from the optical axis of an otherwise rotationally symmetrical lens. The degree of asymmetry is thus dependent on the distance of the corresponding area of the rotationally optically symmetrical Fresnel lens, of which the asymmetrical lens section would otherwise be a portion, from the central rotational axis of the rotationally symmetrical lens, which axis corresponds to the optical axis in FIG. 6. Thus, it will be understood that if incident light rays from a desired field of view, such as that represented by F in FIG. 6, are desired to be seen by a person viewing from the actual eye position shown therein, only an optically asymmetrical lens section such as 37 would be needed. Consequently, optically asymmetrical negative Fresnel lenses or sections thereof may be combined with Fresnel prisms to further enable a person viewing through such a combined system to view areas outside his normal vision or sight area defined by the lines passing from his actual eye position through the actual physical boundaries of the combined lens system.

A problem associated with the design of an optical system such as that described herein is that of spherical aberrations or distortions encountered when Fresnel lenses having curved lens portions corresponding to the shape of a sphere are used. Accordingly, to eliminate such spherical aberrations or distortions, negative Fresnel lenses having aspherical, curved sections or portions may be used. The incorporation of these aspherical negative Fresnel lenses therefore helps to refine the optical quality of the image seen through an optical system such as that described herein.

Referring now to FIGS. 7 through 22, the application of the present novel optical system, including a negative Fresnel lens and Fresnel prism in combination, will be described as used with and mounted on vehicles. In these applications, the optical system for vehicles expands the field of view of a person within the vehicle such that they person may view areas which normally are blocked from view by portions of the vehicle and the like. Such blocked areas or "blind spots" correspond to the obstacle described in conjunction with FIG. 5. These blind spots are eliminated by positioning one or more of the optical systems adjacent the window areas near these blind spots or on or near other vision aiding devices, such as rear-vision mirrors or periscopes, such that the optical system provides an expanded and demagnified viewing area including those blind spots.

Figure 8:
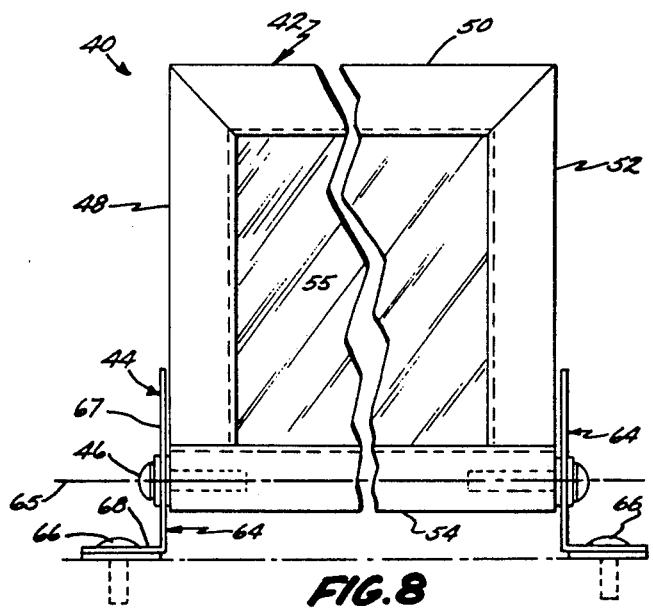
FIG. 8 is a fragmentary front elevation of the embodiment of the support means shown in FIG. 7.
Figure 16:
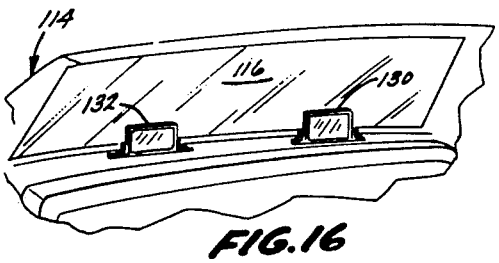
FIG. 16 is a fragmentary, perspective view of another embodiment of the present invention mounted on the shelf adjacent the rear window of an automobile of the sedan type.

FIGS. 7 and 8 reveal one embodiment of the support means which may be used to mount the present novel optical system including a negative Fresnel lens and a Fresnel prism in or on a vehicle. Although the optical system may be incorporated in or mounted directly on the surface of a window, such as a back lite or rear window of an automobile, it will frequently be useful to mount the optical system in a separate support means, especially when the system is to be added to already existing vehicles. Such support means may then be used to mount the optical system next to, near, or adjacent to an existing window for expanding the field of vision therethrough. As shown in FIGS. 7 and 8, such a typical support means 40 comprises a frame 42 pivotally secured to a base 44 by means of securing means 46. More particularly, the frame 42 includes side members 48 and 52, a top member 50, and bottom member 54. An optical system 55 is disposed within frame 42 and includes a negative Fresnel lens 56, and a Fresnel prism 58 is disposed parallel to and adjacent one another within the frame members 48, 50, 52 and 54 in slots 60 and 62, respectively. The frame 42 is supported on base 44, which base comprises two brackets 64 by means of securing means 46 which may comprise machine bolts or other similar fasteners. Since the securing means or bolts 46 are positioned along the same rotational pivot axis 65 in the bottom member 54 of base 42, the entire frame and included negative Fresnel lens 56 aand Fresnel prism 58 may be pivoted or rotated with respect to the system axis such that the optical system may be secured in various positions according to the desired location for the expanded and demagnified viewing area viewed therethrough, as was described above in connection with FIG. 5. Additionally, brackets 64 include slotted portions 67 which allow the frame 42 including optical system 55 to be adjusted with respect to the position of base 44. The entire support means 40 including the optical system 55 defines one optical unit which may be secured in various positions in or on a vehicle by means of mounting flanges 68 forming a part of brackets 64 and securing means 66. Typically, the support means 40 shown in FIGS. 7 and 8 may be used to mount the optical system 55 exterior of and adjacent to the rear window of a station wagon on the tailgate thereof as shown in FIG. 12, on the interior of a sedan-type automobile on the package shelf thereof adjacent the rear window as shown in FIGS. 13, 14 and 16, or in the rear areas of a van truck as shown in FIGS. 18 and 19.

Figure 9:
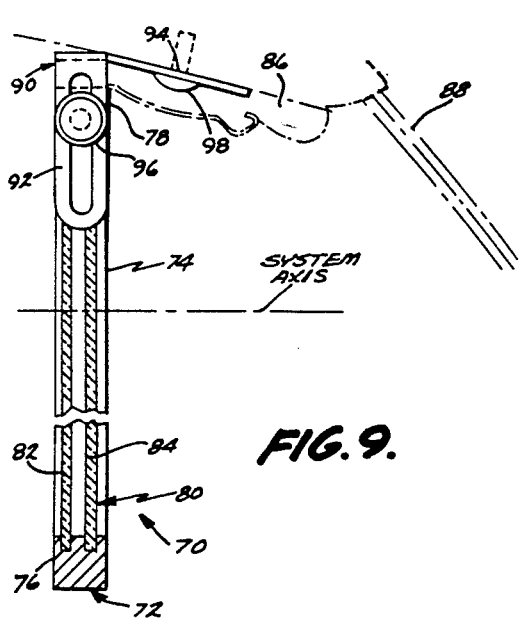
FIG. 9 is a side elevation of another embodiment of the support means for mounting the optical system comprising the present invention on the interior of the roof of a vehicle.
Figure 15:
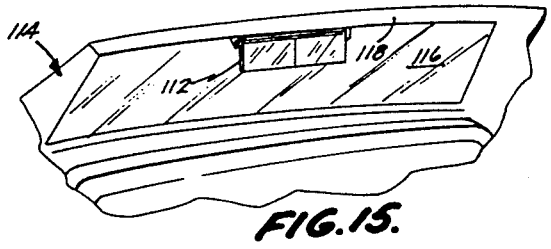
FIG. 15 is a fragmentary perspective view of one embodiment of the present invention mounted on the interior of the roof adjacent the rear window of an automobile of the sedan type.
Figure 10:
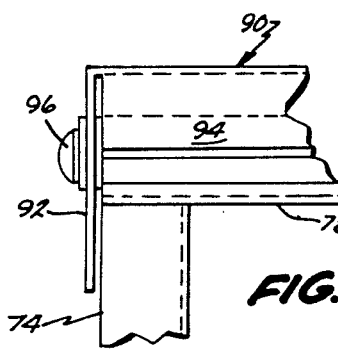
FIG. 10 is a fragmentary, front elevation of a portion of the support means shown in FIG. 9.
Figure 17:
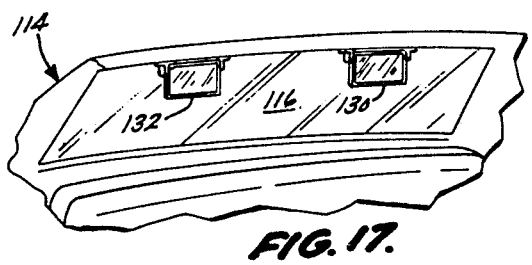
FIG. 17 is a fragmentary, perspective view of the embodiment of the present invention shown in FIG. 16 mounted on the interior of the roof adjacent the rear window of an automobile of the sedan type.

Referring now to FIGS. 9 and 10, another embodiment 70 of a support means is shown which may be used to mount an optical system comprising the present novel invention at various positions in or on an automobile. Support means 70 comprises a frame 72 including two side members 74, a bottom member 76 and a top member 78. The frame is similar to frame 42 but is mounted in an inverted manner. The frame 72 may be used to mount or support an optical system 80 such as that described above including a negative Fresnel lens 82 and a Fresnel prism 84. The support means 70 is different from support means 40 in that it is designed to support the optical system 80 from the roof area 86 of an automobile the rear window thereof 88. The frame 72 including the optical system 80 is suspended from the roof area 86 by a base means or a bracket 90 including slotted side portions 92 and a mounting flange 94. The frame 72 is secured to the slotted portions 92 of the bracket 90 by means of securing means 96. Therefore, it will be understood that the frame 72 may be rotated with respect to the system axis and secured in various positions thereto by means of securing means 96 such that the location of the expanded and demagnified viewing area visible with the optical system 80 may be adjusted. Similarly, as with the support means 40, the entire optical system as supported means 70 comprises one optical unit which may be mounted on the roof area 86 by means of other securing means 98. Typically, support means 70 is utilized to mount the optical system comprising the present novel inventive concept on the interior of various types of vehicles on the roof areas thereof adjacent the rear window as shown in FIGS. 11, 15 and 17.

In reference to FIG. 11, there is shown therein one embodiment 100 of the optical system as mounted on an automobile of the station wagon-type 102. The station wagon 102 includes a roof area 104, a rear window 106, and a tailgate 108. The optical system 100 comprising one optical unit, such as that shown in FIGS. 9 and 10, is mounted on the roof area 104 adjacent the rear window 106. The optical system 100 provides an expanded and demagnified viewing area, shown by the shaded area Z, to the rear of and below the tailgate or rear portion of the automobile 102. The optical system or unit 100 is mounted generally vertically and approximately normal to the system axis such that the viewing area Z includes a desired viewing area to the rear of and below the rear window which is outside the normal direct vision areas visible through the rear window 106, denoted by G, and also the direct vision areas visible through the physical boundaries of the optical unit 100, denoted by 11.

As shown in FIG. 12, another embodiment of the optical system includes mounting an optical unit 110 adjacent the rear window 106 of a station wagon 102 on the exterior thereof on the tailgate 108. Mounting the optical unit 110 in such a position provides the driver or person within the vehicle with an expanded and demagnified viewing area Z' which is closer to the rear of the vehicle 102 as denoted by the distance J'. The viewing area Z' includes an area outside both the direct normal vision area through the rear window 106 denoted by G', and the direct normal vision area visible through the boundaries of the optical unit 110 denited by H'. Again, as with unit 100, the optical unit 110 is mounted approximately vertically and approximately normal to the system axis. The embodiment 110 provides a vision or viewing area much closer to the rear of the vehicle than does the embodiment 100 shown in FIG. 11, as is apparent from a comparison of the distance J' and J. However, the location of both of the viewing areas Z and Z' may be adjusted relative to the rear of the vehicle 102 by adjusting the parameters of the optical unit as described above and by rotating the position of the optical unit with respect to the system axis. Typically, the physical dimensions of the optical unit 100 and 110 are approximately five inches by five inches. The optical unit 100 typically utilizes either a symmetrical or asymmetrical negative Fresnel lens having a focal length in the range of approximately a negative seven to a negative twelve inches, a Fresnel prism having a angel of deviation of approximately 17° with the resulting minimum magnification factors being in the range of approximately 0.08 to 0.13 or 8 to 13% of normal size. Similarly, the optical unit 110 includes a negative Fresnel lens having a focal length in the range of approximately a negative seven to a negative twelve inches, a Fresnel prism having an angle of deviation in the range of approximately 15° – 50° with a resulting demagnification factor of between about 0.15 and 0.30 or 15 and 30% of normal size. These values are given for exemplification only and are calculated for an object approximately 150 feet from the optical system and for an actual eye to optical system distance of approximately 80 inches.

Referring now to FIG. 13, another embodiment of 112 of an optical unit similar to that described above is shown as mounted adjacent the rear window 116 of an automobile of the sedan type 114. As shown in FIG. 15, the optical unit 112 may be mounted on the roof area 118 of the sedan 114 interior of and adjacent to the rear window 116. However, unit 112 may also be mounted on the package shelf adjacent the bottom of the rear window 16. The optical unit 112 includes two sets of negative Fresnel lenses and negative Fresnel prisms disposed side by side one another in a frame such as that shown in FIGS. 7 and 8 or FIGS. 9 and 10. As shown in FIG. 13, the negative Fresnel lenses and Fresnel prisms are disposed and positioned such that the expanded and demagnified viewing areas K and K' reveal areas laterally adjacent to the rear area of the vehicle 114. The size and position of the areas K and K' may be varied by adjusting or changing the parameters of the optical unit 112 such that more or less of the vehicles 120, 122, 124 and 126, which are traveling in lanes of the highway adjacent the vehicle 114, may be seen. Vehicles 120 and 122 represent normal size cars and vehicles 124 and 126 represent compact cars. Line 128 represents the edge of the driver's forward vision as he usually sits in the driving area of the vehicle 114. Thus, as may be seen in FIG. 13, the driver's direct normal vision area visible through the rear window 116, represented by L, is supplemented by the viewing areas K and K'. L' represents the small partial blind spot which is caused by the positioning of the optical unit 112 over a portion of the area of the rear window 116. However, this partial blind spot L'' is well compensated for by the remainder of the normal viewing area left in the rear window 116 and causes no difficulty in viewing therethrough. The typical overall dimensions of the optical unit 112 are approximately 4 inches by 10 inches. Typically, the parameters for optical unit 112 includes a negative Fresnel lens having a focal length of between about negative seven and negative twelve inches, a Fresnel prism having an angle of deviation in the range of between about 15° to 25° and a resulting minimum magnification factor in the range of between about 0.08 and 0.13 or 8 to 13% of normal size. Again, these are typical values for an object-optical system distance of approximately 150 feet and an actual eye-optical system distance of approximately 80 inches.

In reference to FIG. 14, another embodiment of the optical system similar to that shown in FIG. 13 is revealed. This embodiment of the optical system includes two optical units 130 and 132 mounted adjacent the sides or lateral edges of the rear window 116 of the vehicle 114 and also providing an expanded and demagnified viewing area laterally and to the rear of the vehicle. In this embodiment of the system, the two optical units 130 and 132 may be mounted either on the package shelf adjacent the bottom of the inside of the rear window 116, as shown in FIG. 16, or on the roof area of the vehicle adjacent the top of the inside of the rear window 116, as shown in FIG. 17. As indicated above, support means 40 may be used to mount the two optical units as shown in FIG. 16, and support means 70 may be used to mount the two optical units as shown in FIG. 17. In a manner similar to the system utilizing optical unit 112 shown in FIG. 13, the optical units 130 and 132 provide expanded and demagnified viewing areas Q and R which allow the driver or person within the vehicle 114 to view the adjacent lanes of traffic on either side of his vehicle, including both full or normal sized vehicles and compact vehicles as described above. The normal direct vision area of the driver or person within the vehicle 114, is shown as area T in FIG. 14, with areas T' and T" denoting the partial blind spots which are encountered due to the positioning of the optical units 130 and 132 in the area of rear window 116. However, as described above, these partial blind spot areas will be fully compensated for by the remainder of the direct normal vision area seen by the viewing person through the remainder of the area of the rear window 116. The optical units 130 and 132 will typically have the physical dimensions of 4 inches by 5 inches. Typical parameters for the lenses and prisms included in those units include a negative Fresnel lens having the focal length in the range of between about negative 7 and negative 12 inches, a Fresnel prism having an angle of deviation in the range of between about 15° and 25° and the resulting demagnification factor of between about 0.08 and 0.13 or 8 to 13% of normal size. Again these example values are for an object-optical system distance of approximately 150 feet and an actual eye-optical system distance of approximately 80 inches. All of the optical units shown in FIGS. 13 and 14, including optical unit 112 and optical units 130 and 132, are typically positioned with the planes of their respective negative Fresnel lenses and Fresnel prisms positioned perpendicularly to the vertical plane including the system axis for the respective units. Thus, the respective units may be pivoted while maintaining the perpendicular relationship to that vertical plane as described above in conjunction with the support means 40 and 70 such that the position of the expanded and demagnified viewing areas may be adjusted to be closer to or further away from the edge of the vehicle 114. In certain applications, it is advantageous to mount the optical units perpendicular to a line running from the eye or virtual eye position through the optical center of the Fresnel lens, whether or not that lens includes the optical center. As explained above, an "off-axis" lens section may not include the optical center of the lens. As will be understood, the optical center does not necessarily coincide with the geometric center of the lens or optical unit. Thus, the optical system will also perform its function with the planes of lenses and prisms skewed to the vertical plane including the system axis. In fact, the optical system is functional in any orientation, although the fields of view therethrough are maximized for persons within the vehicle by positioning the units in one of the above described positions.

Referring now to FIGS. 18 and 19, two additional embodiments of the optical system are shown positioned on the rear areas of a vehicle of the van or panel truck type. One embodiment includes optical units 134 and 136 positioned either adjacent to rear windows 138 and 140 of a van or panel truck 142 in separate support means, mounted within the frameworks of the rear windows, or secured by adhesive or other means directly to the surface of the rear window. In this embodiment, the optical units 134 and 136 are positioned approximately normal to the system axes for the truck. These units 134 and 136 provide expanded and demagnified viewing areas V and V' below and to the rear of the truck 142.

Similarly, should the truck be loaded with cargo or other materials such that the view through the rear windows 138 and 140 is obstructed, an alternate embodiment of the optical system may be utilized wherein a vision aiding means is disposed along the line of sight of a person within the vehicle extending between the eye position of the person and the position of the present, novel optical system on the vehicle. The second embodiment of the system or truck 142 includes optical units 144 and 146 which are mounted on the sides of the truck at the rear extremity thereof such that they are in line with the viewing area of a rear vision aiding means comprising an externally mounted rearview mirror positioned adjacent the driver and/or the passenger in the truck 142. Thus, optical units 144 and 146 provide expanded and demagnified viewing areas W and W' both behind and below the optical units 144 and 146 and van truck 142. Similarly, as described above, the relative positions of the optical units 134, 136, 144 and 146 may be varied with respect to the system axes respectively thereof in order to adjust the location of the expanded and demagnified viewing areas closer to or further away from the rear extremities of the truck 142. Additionally, asymmetrical negative Fresnel lenses may be substituted for rotationally symmetrical negative Fresnel lenses in these optical units to further enable the optical system to be directed at a desired viewing area. The general dimensions and typical parameters for these optical units will be consistent with those enumerated above for the other embodiments of the optical system.

Any of the optical units described herein may be operably associated with the transmission means for movement of the vehicle such that the optical units may be extended and retracted from their normal viewing position when their uses is not required. Particularly, in the embodiments of the optical system wherein the optical units are positioned on the exterior of the vehicles, namely, optical units 110, 144 and 146, such a mounting of the optical units is especially advantageous. Accordingly, any of the vehicles incorporating such optical units include a transmission means (not shown) for movement of the vehicle which transmission means includes a reverse gear and a gear selection means (not shown). Additionally, a motive power means (now shown) for extending and retracting the units from the field of view of the person desiring its use will be included. The motive power means such as an electric motor, is associated with the gear selection means such that when the reverse gear is selected, the optical unit will be extended into the field of view of the person thereby enabling the person to view the expanded and demagnified viewing are visible therethrough. When the gear selection means is taken out of reverse, the optical unit will be retracted out of the way. The control circuitry (not shown) may also be included to extend and retract the optical unit independent of the transmission means. Thus, for example, for the embodiment of the optical system utilizing optical unit 110, the station wagon 102 may include an electric motor and camming means (not shown) for extending the optical unit 110 vertically upwardly for use in viewing the viewing area Z' during backing-up operation and subsequently for retracting it into the tailgate after the backing-up operation has been completed.

Figure 20:
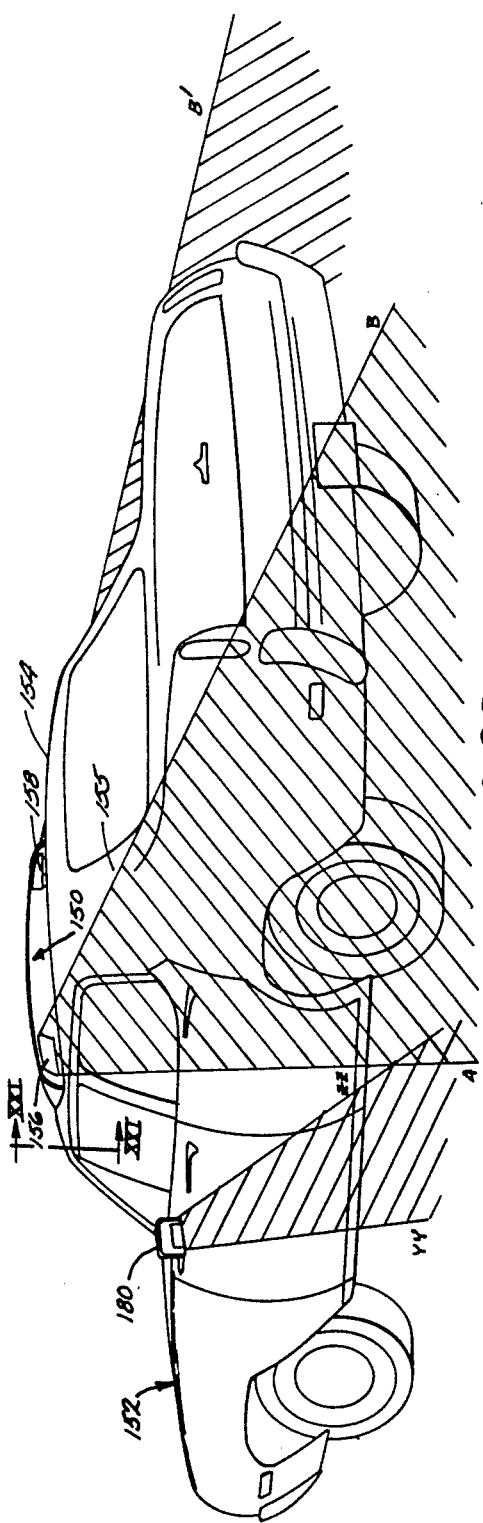
FIG. 20 is a perspective view of other embodiments of the present invention mounted on both a rearview periscope and a rearview side mirror, both of which are mounted on an automobile.
Figure 22:
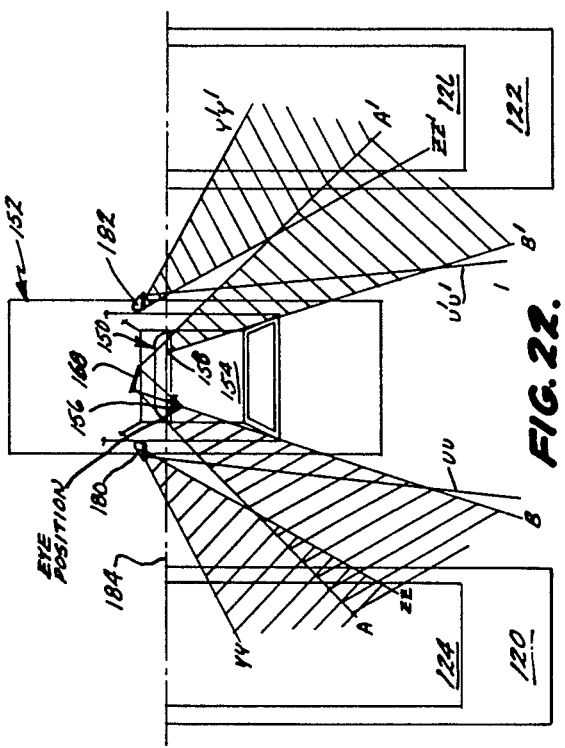
FIG. 22 is a plan view of the expanded and demagnified viewing areas obtained laterally of either side of an automobile using the embodiments of the invention shown in FIGS. 20 and 21.
Figure 21:
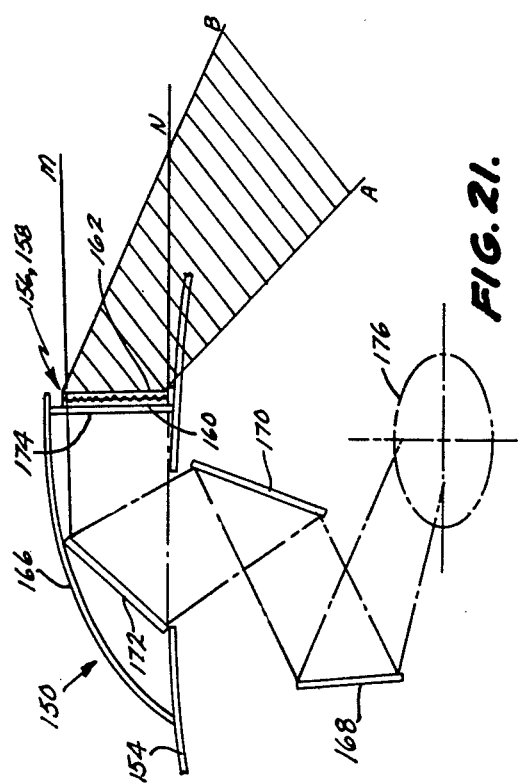
FIG. 21 is a cross-sectional view of the invention mounted on a rearview periscope taken along line XXI—XXI of FIG. 20.

A further application of the present novel optical system incorporating a negative Fresnel lens and Fresnel prism is shown in FIGS. 20–22 wherein the optical system is mounted on or adjacent to an additional vision aiding meand incorporated on a vehicle. One embodiment, shown in FIG. 20, is that wherein the optical system is mounted on an additional rear vision aiding means comprising a rear vision periscope 150 installed on the roof 154 of a vehicle or automobile 152. The periscope 150 would normally be used by the driver of the vehicle to increase his rearward field of vision. With the incorporation of the optical system including optical units 156 and 158 to the rearview periscope, the driver's field of vision will be increased laterally and to the rear of the vehicle and angularly downwardly along the side of the vehicle such that objects or other vehicles in adjacent lanes to the vehicle 152 will be visible. Such installations of the optical units 156 and 158 immediately adjacent the lateral edges or sides of the rearview periscope 150 will be especially useful for night driving when these optical units will enable the driver to view the headlight and running light areas of passing vehicles immediately adjacent his vehicle thereof, which headlight and running light areas would normally be blocked from view since they are below the normal window areas of the vehicle and out of the field of vision of the existing normal side view mirrors.

Referring now to FIG. 21, an optical unit 156 or 158 including a negative Fresnel lens and a Fresnel prism 162 is shown mounted on a rear vision periscope of the type shown at 150. Rear vision periscope 150 is mounted integrally with the roof 154 of vehicle 152 and includes an aerodynamically shaped shroud or cover 166 shielding the internal elements of the periscope from the outside. Periscope 150 is a three mirror periscope and includes a first mirror 168, a second mirror 170, and a third mirror 172. A transparent field cover means or field glass 174 completes the periscope and is mounted between the end of the shroud or cover 166 and the roof 154. The optical system comprising optical units 156 and 158 may be mounted directly on the surface of the cover glass 174 by a suitable adhesive means (as shown in FIG. 21) or they may be mounted immediately adjacent the cover glass 174 on a separate support means (not shown). Certain periscopes which may be used with the optical system described herein may include a lens or merely just an opening where cover means 174 is disposed in the embodiment shown. When no cover means 174, or a lens having a surface unsuitable for direct attachment of the optical system, is used, the negative Fresnel lens and Fresnel prism may be mounted in a support means adjacent the periscope. Thus, as shown in FIG. 21, entering light rays M and N from the rear of the vehicle would normally represent the boundaries of the field of vision visible through the periscope without the incorporation of the present novel optical system. Rays M and N enter from the rear of the vehicle through cover glass 174 and are reflected by third mirror 172 to second mirror 170 which, in turn, reflects them to first mirror 168. The periscope shown in FIG. 21 is of the type shown and described in U.S. Pat. Applications entitled REARVIEW PERISCOPE ADJUSTMENT MEANS FOR VEHICLES, filed July 30, 1971, Ser. No. 167 730 and IMPROVED REARVIEW PERISCOPE FOR VEHICLES, filed July 30, 1971, Ser. No. 167 599, both of which are incorporated by reference herein. The first mirror 168 may be adjusted to accommodate driver's eye positions which fall anywhere within the eye elipse 176 thereby enabling the periscope to accommodate all sizes of drivers.

With the incorporation of the optical units 156 and 158, the driver's field of vision through the periscope 150 is expanded to include the cross-hatched area represented between the light rays A and B as shown in FIG. 21. Thus, when the units 156 and 158 are mounted immediately adjacent the lateral edges of the periscope 150, as shown in FIG. 20, the negative Fresnel lens and Fresnel prism may be arranged to direct light rays from the rear lateral quarter area of the vehicle into the periscope. This area thus includes an area which is normally blocked from the driver's and/or the passengers's vision within the vehicle by the roof support post 155 as shown in FIG. 20. As shown in FIG. 22, the expanded and demagnified viewing areas obtained by the combination of the present novel optical system and the periscope 150 provide fields of view within the areas represented between the light rays A and B and A' and B'. Thus, the driver of the vehicle 152 can, with a quick glance of the first mirror 168 of his periscope 150, see normal sized vehicles, represented by 120 and 122 in FIG. 22, and compact sized vehicles represented by 124 and 126 in FIG. 22, in both traffic lanes which are adjacent to the vehicle 152. As mentioned above, such fields of vision are especially useful at night, when the driver of the vehicle 152 can see the headlight and running light areas of passing vehicles on either side of his vehicle 152, which headlight and running light areas would otherwise be blocked from vision by the various structural components of the vehicle 152 including rear roof support post 155. Consequently, the driver's and/or passenger's vision within vehicle 152 is greatly enhanced by the novel combination of the periscope 150 and the optical system described herein including optical units 156 and 158.

Although the modified embodiment of the invention described above is shown in use with a three-mirror periscope, other periscopes and rear vision aiding devices including different numbers and types of optical elements may be utilized as well.

Also shown in FIGS. 20–22, is another modification of the present novel invention wherein the optical system is incorporated on another type of rear vision aiding means such as a rearview side mirror 180. As shown in FIG. 22, rearview side mirrors 180 and 182 may be incorporated on both sides of the car to enlarge the driver's field of vision along either side of the vehicle. Normally, mirrors 180 and 182 would be utilized to view rearwardly along the lateral sides of the vehicle and the extent of thee lateral vision area would normally be limited as shown in FIG. 22 by the light rays UU and .U'U'. Thus, it will be understood that at certain time vehicles in adjacent lens will be in blind spots of the driver in vehicle 152 and out of the normal vision area obtainable through mirrors 180 and 182. However, as shown in FIGS. 20 and 22, an optical system including an optical unit having a negative Fresnel lens and a Fresnel prism similar to those described in the other applications above, may be secured directly to the surface of the rearview side mirrors 180 and 182 in order to provide an expanded and demagnified viewing area laterally of the vehicle as represented by the shaded areas between lines YY and ZZ and lines Y'Y40 and Z'Z', as shown in FIGS. 20 and 22. Additionally, in certain applications, the optical unit may be mounted adjacent the surface of the rearview side mirrors. Thus, the optical unit may be either spaced a small distance from the mirror surface while being mounted parallel to the mirror or the unit be be skewed to the surface of the mirror to further direct the field of view visible through the combined optical unit and mirror. Thus, vehicles which would not otherwise be normally visible with side mirrors 180 and 182 in the adjacent lanes to vehicle 152 will be easily visible with the incorporation of the present novel optical system on the respective mirrors. Additionally, as is also shown in FIG. 22, the inclusion of the present novel optical system on both the periscope 150 and rearview side mirrors 180 and 182 on the same vehicle provides a nearly continuous expanded and demagnified viewing area of the adjacent lanes to vehicle 152 from a position within the driver'normal field of vision to the rear of his vehicle up to a line represented by 184 which is the limit of the driver's and/or passenger's peripheral vision as he usually sits viewing the road ahead of the vehicle.

As will be apparent from the above description and the descriptions of the previous embodiments of the present invention, the negative Fresnel lenses and Fresnel prisms utilized and incorporated on periscope 150 and rearview side mirrors 180 and 182 may be arranged to direct the expanded and demagnified field of view to various areas adjacent the vehicle. It will also be apparent that through the use of asymmetrical negative Fresnel lens sections, and Fresnel prisms having greater or lesser angles of deviation of incident light rays, the expanded and demagnified viewing areas may be further positioned into desired viewing areas.

It will be understood, therefore, that the novel and unique combination of a negative Fresnel lens and a Fresnel prism described herein may be used to provide an expanded and demagnified viewing area around obstacles and the like which is particularly useful for viewing blind spots associated with the driving of vehicles. The optical system incorporating such a Fresnel lens and Fresnel prism combination may be mounted such that the lens or the prism is closest to the actual eye position of the viewer with either the grooved or rough sides of the lens and prism extending either inwardly or outwardly of the system. Also, aspherical negative Fresnel lenses may be utilized with the system in order to eliminate spherical aberrations and distortions which would otherwise be encountered. Additionally, asymmetrical negative Fresnel lens or Fresnel lens sections may be utilized to further direct the expanded and demagnified viewing areas visible with the system. Further, the combination may be mounted such that it is either extendible or retractable from various positions on a vehicle during periods when its use is desired. Finally, the optical system may be used for forward vision as well as rearward vision. Thus, this system is adaptable for use on large construction equipment such as earth movers and the like where various structural portions of the equipment block substantial portions of the driver's viewing area.

As will be appreciated, the unique advantages of the present system are in part due to its relatively thin configuration. Thus, the system is easily adapted to be mounted in thin frames, as described above, within the glass areas of the vehicle normally occupied by windows, flat against surfaces of the existing windows and exterior of the vehicle adjacent the existing windows as well as in many other locations. The system thus takes up little more space than a double thickness of glass and may be conveniently located in many applications because of this feature.

While several forms of the invention have been shown and described, other forms will not be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. An optical system for vehicles for expanding and directing the field of view of a driver of the vehicle located within a vehicle, said system comprising in combination: at least one optical unit including a divergent lens and a prism having a specified angle of deviation of incident light rays, said lens and prism disposed in separate planes adjacent one another on said vehicle about a system axis comprising a line of sight extending from a specified eye position of the driver within said vehicle through said optical unit, said vehicle including a plurality of windows and having roof support posts and other structure generally to the rear of a driver when in position to drive each such vehicle, said posts and structure obstructing at least portions of the view of the driver generally rearwardly and to at least one side of the vehicle; said optical unit being mounted near one of said windows generally behind the driver's position; said lens and prism in combination shifting the virtual eye position of the driver viewing through said system to a point intermediate the distance between said specified eye position and said unit and away from said system axis; said unit providing an expanded and demagnified viewing area for the driver around said posts and structure generally rearwardly and laterally to one side of said vehicle; said divergent lens being an off-axis lens section having a predetermined degree of optical asymmetry determining expansion, demagnification and position of the viewing area of said lens to facilitate said rearward and lateral view.

2. An optical system for vehicles as described in claim 1 wherein said divergent lens is a Fresnel lens having a negative focal length.

3. An optical system for vehicles as described in claim 2 wherein said prism is a Fresnel prism.

4. An optical system for vehicles as described in claim 3 wherein said Fresnel lens is aspherical thereby eliminating spherical aberrations in said system.

5. An optical system for vehicles as described in claim 3 wherein said lens and prism each include a flat side and a grooved side, said lens and prism being disposed parallel to one another in said support means such that said flat sides face outwardly and said grooved sides face inwardly.

6. An optical system for vehicles as described in claim 3 wherein at least one of said optical units is mounted on at least one window of a vehicle.

7. An optical system for vehicles as described in claim 3 wherein said system further includes support means for supporting said lens and prism on said vehicle.

8. An optical system as described in claim 7 wherein said support means is adjustable whereby the distance of said expanded and demagnified viewing area from said vehicle is selectively adjustable.

9. An optical system for vehicles as described in claim 3 wherein said vehicle includes vision aiding means for facilitating the viewing of said optical unit disposed along said line of sight extending between said specified eye position and the position of at least one of said optical units on said vehicle.

10. An optical system for vehicles as described in claim 9 wherein said vision aiding means is a rear vision aiding means.

11. An optical apparatus for expanding and directing the field of vision of a person; said apparatus comprising in combination optical means for aiding the vision of a person and an optical unit associated therewith including a divergent lens and a prism, said lens and prism mounted adjacent one another, one behind the other, along a line of sight extending from said vision aiding means to said optical unit; said optical unit adapted to provide a view at a sharp angle from said line of sight around an obstacle, structure or the like otherwise in said line of sight to expand and direct the field of vision otherwise obtainable with said vision aiding means; said divergent lens being an off-axis lens section having a predetermined degree of optical asymmetry determining expansion, demagnification and position of the viewing area of said lens to facilitate said sharp angle view.

12. An optical apparatus as described in claim 11 wherein said divergent lens comprises a Fresnel lens having a negative focal length.

13. An optical apparatus as described in claim 11 wherein said prisms is a Fresnel prism having a specified angle of deviation of incident light rays.

14. An optical apparatus as described in claim 11 wherein said optical unit includes a Fresnel lens having a negative focal length and a Fresnel prism having a specified angle of deviation of incident light rays.

15. An optical apparatus as described in claim 14 wherein said optical vision aiding means comprises a rear view optical vision aiding means for providing a field of view behind a person in a predetermined position.

* * * * *